2,796,413

MODIFICATION OF PARTIALLY HYDROLYZED POLYVINYL ESTER WITH A DICARBOXYLIC ACID ANHYDRIDE

Massimo Baer, Springfield, Mass., assignor to Monsanto Chemical Company, St. Louis, Mo., a corporation of Delaware No Drawing. Application October 15, 1954,
Serial No. 462,601

5 Claims. (Cl. 260—78.4)

This invention relates to a process for preparing polyvinyl alcohol derivatives. More particularly, the invention relates to polyvinyl alcohol derivatives containing both ester groups and carboxylic acid groups.

For many purposes, it is desirable to have long chain organic compounds containing both ester groups and acid groups and in some cases hydroxyl groups in addition. Several methods have been developed to obtain the desired compounds which methods are more or less successful depending on the strictness of the requirements of the desired product.

One object of this invention is to provide a new process for preparing long chain organic compounds containing ester groups and carboxylic acid groups and, if desired, hydroxyl groups.

Another object of this invention is to provide a process for the preparation of polyvinyl alcohol derivatives having attached thereto both ester groups and carboxylic acid groups.

These and other objects are attained by reacting a partially hydrolyzed polyvinyl ester with a carboxylic acid anhydride in solution in dimethyl formamide under substantially anhydrous conditions.

The following examples are given in illustration and are not intended as limitations on the scope of this invention. Where parts are mentioned, they are parts by weight.

Example I

Dissolve 100 parts of a partially hydrolyzed polyvinyl acetate containing about 25% acetate groups (75% hydrolyzed) in about 1200 parts of substantially anhydrous dimethyl formamide and add to the solution 135 parts of maleic anhydride. Heat the resultant solution at about 80° C. for about 2 hours. Cool and pour the reaction medium into benzene. The reaction product is insoluble in benzene and precipitates when added thereto. The precipitated product is soluble in water and methanol and in a mixture of 75 parts of acetone and 25 parts of water. By titration, it is found that approximately 40% of the available hydroxyl groups are combined with the maleic anhydride. The product therefore contains about 25% acetate groups, about 30% maleic acid groups, and about 45% hydroxyl groups calculated on the hydroxyl groups in polyvinyl alcohol.

To obtain a product in which a greater proportion of the hydroxyl groups are converted, continue the heating at 80° C. until the desired amount of reaction has taken place. To completely remove the hydroxyl groups, a reaction time of 6–10 hours is necessary.

If an aromatic dicarboxylic acid anhydride such as phthalic anhydride or an aliphatic saturated dicarboxylic acid anhydride such as adipic or sebacic anhydride is substituted for the maleic anhydride of Example I, the reaction proceeds in substantially the same manner and at substantially the same rate.

The raw materials for the process of this invention are a partially hydrolyzed polyvinyl ester, an anhydride of a dicarboxylic acid and dimethyl formamide. The polyvinyl ester should be hydrolyzed to the extent of from 50 to 98% and the ester groups may be formate, acetate, propionate and butyrate, or mixtures thereof. A limiting feature of the ester groups and the amount of hydrolysis is the requirement that the partially hydrolyzed material be soluble in substantially anhydrous dimethyl formamide. Pure polyvinyl alcohol is not soluble therein but a material containing 2% acetate groups is soluble enough to permit the reaction to take place.

The anhydride may be any anhydride of an organic dicarboxylic acid which is soluble in the dimethyl formamide. Suitable compounds are the anhydrides of maleic, citraconic, phthalic, adipic, sebacic, glutaric, etc. acids. The amounts of anhydride used depends on the extent of hydrolysis of the polyvinyl ester and on the amount of esterification desired. At least one mol of anhydride per unit of vinyl alcohol to be esterified must be used and an excess over that amount is preferred since the excess permits more rapid completion of the reaction.

The solvent is substantially anhydrous dimethyl formamide. The amount of solvent is not critical except that enough should be used so that the resulting solutions are thin enough to be easily stirred and poured. In general, it is satisfactory to use from 500 to 1500 parts of dimethyl formamide per 100 parts of hydrolyzed ester polymer.

The temperature of the reaction should be confined to from 70 to 85° C. and the reaction should be carried out at atmospheric pressure. The use of higher temperatures and superatmospheric pressures tend to cause reaction of both acid groups of the dicarboxylic acids with hydroxyl groups to form ring compounds which have no acidic properties. At 70–85° C., the extent of the reaction is controlled by its duration.

It is not necessary and generally is undesirable to use a catalyst to promote the reaction. In addition, the presence of substantial amounts of water should be avoided.

The compounds of this invention are useful as soil conditioners, destaticizers, finishing agents for textiles, etc. They may be cast into films or molded by conventional methods. Under properly controlled conditions of temperature and pressure, they may be cross-linked without the aid of catalysts to provide a thermoset product.

The compounds of this invention may be best described by reference to the following formula:

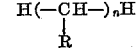

wherein R consists of $x$ ester groups, $y$ hydroxyl groups and $z$ dicarboxylic acid residues, the total of $x$, $y$ and $z$ equaling $n$ wherein $n$ is from 50 to 3000. The ester groups are the aforesaid formate, acetate, propionate and butyrate groups and the dicarboxylic acid residues are groups in which one of the caboxylic acid radicals is attached to the polymer chain and the other is present as a free acid radical. The ratios of ester groups to hydroxyl groups and dicarboxylic acid residues is best described in terms of $x$, $y$, $z$ and $n$. Thus $x$ may vary from $0.02n$ to $0.5n$, $y$ may vary from $0.1n$ to $0.8n$ and $z$ may vary from $0.1n$ to $0.75n$. In any variation, the sum of $x$, $y$ and $z$ is equal to $n$.

With respect to the above formula, the product of Example I has $.25n$ acetate groups, $0.45n$ hydroxyl groups and $0.3n$ maleic acid groups and $n$ is equal to about 250.

What is claimed is:

1. A process for preparing a polymeric material which comprises dissolving a partially hydrolyzed polyvinyl ester in dimethyl formamide, adding an anhydride of a dicarboxylic acid to the solution, and heating the solution at from 70 to 85° C. at atmospheric pressure, said process being carried out under substantially anhydrous conditions.

2. A process as in claim 1 wherein the hydrolyzed polyvinyl ester is hydrolyzed polyvinyl acetate.

3. A process as in claim 2 wherein the polyvinyl acetate is hydrolyzed to the extent of from 50 to 98%.

4. A process as in claim 3 wherein the polyvinyl acetate is hydrolyzed to the extent of 75%.

5. A process as in claim 1 wherein the acid anhydride is maleic anhydride.

References Cited in the file of this patent

UNITED STATES PATENTS

| | | |
|---|---|---|
| 2,484,415 | Malm et al. | Oct. 11, 1949 |
| 2,555,646 | Jones | June 5, 1951 |
| 2,682,519 | Caldwell | June 29, 1954 |